United States Patent
Carter et al.

[11] Patent Number: 6,148,377
[45] Date of Patent: *Nov. 14, 2000

[54] SHARED MEMORY COMPUTER NETWORKS

[75] Inventors: John B. Carter, Salt Lake City, Utah; Scott H. Davis, Groton, Mass.; William Abraham, Windham, N.H.; Steven J. Frank, Hopkinton, Mass.; Thomas G. Hansen, Leominster, Mass.; Robert S. Phillips, Brookfield, Mass.; Daniel J. Dietterich, Acton, Mass.; David Porter, Littleton, Mass.

[73] Assignee: Mangosoft Corporation, Westborough, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/754,481

[22] Filed: Nov. 22, 1996

[51] Int. Cl.[7] .................................................. G06F 12/08
[52] U.S. Cl. ..................... 711/147; 711/100; 711/201; 711/202; 711/203
[58] Field of Search .................... 711/203, 202, 711/201, 147, 100

[56] References Cited

U.S. PATENT DOCUMENTS

| | | | |
|---|---|---|---|
| 4,096,567 | 6/1978 | Millard et al. | 364/200 |
| 4,426,688 | 1/1984 | Moxley | 365/200 |
| 4,710,926 | 12/1987 | Brown et al. | 371/9 |
| 4,868,738 | 9/1989 | Kish et al. | 364/200 |
| 4,934,764 | 6/1990 | Leitermann et al. | |
| 5,055,999 | 10/1991 | Frank et al. | |
| 5,077,736 | 12/1991 | Dunphy, Jr. et al. | 371/10.1 |
| 5,117,350 | 5/1992 | Parrish et al. | 395/428 |
| 5,119,481 | 6/1992 | Frank et al. | |
| 5,226,039 | 7/1993 | Frank et al. | |
| 5,245,563 | 9/1993 | Hauck, Jr. | |
| 5,247,673 | 9/1993 | Costa et al. | 395/650 |
| 5,251,308 | 10/1993 | Frank et al. | |
| 5,282,201 | 1/1994 | Frank et al. | |
| 5,297,265 | 3/1994 | Frank et al. | |
| 5,313,626 | 5/1994 | Jones et al. | 395/575 |
| 5,313,647 | 5/1994 | Kaufman et al. | |
| 5,335,325 | 8/1994 | Frank et al. | |
| 5,341,483 | 8/1994 | Frank et al. | |
| 5,390,326 | 2/1995 | Shah | 395/575 |
| 5,423,037 | 6/1995 | Hvasshovd | 395/600 |
| 5,452,447 | 9/1995 | Nelson et al. | |
| 5,493,728 | 2/1996 | Solton et al. | |
| 5,513,314 | 4/1996 | Kandasamy et al. | |
| 5,560,027 | 9/1996 | Watson et al. | 395/800 |
| 5,592,625 | 1/1997 | Sandberg | 395/200.08 |
| 5,906,658 | 5/1994 | Raz | 710/39 |

FOREIGN PATENT DOCUMENTS

| | | |
|---|---|---|
| 0 288 636 A2 | 11/1988 | European Pat. Off. |
| 0 661 651 A1 | 7/1995 | European Pat. Off. |
| 2 257 273 | 1/1993 | United Kingdom |
| WO 95/02307 | 1/1995 | WIPO |
| WO 95/14279 | 5/1995 | WIPO |
| WO 95/22111 | 8/1995 | WIPO |
| WO 95/25306 | 9/1995 | WIPO |
| WO 96/23268 | 8/1996 | WIPO |
| WO 96/30847 | 10/1996 | WIPO |

OTHER PUBLICATIONS

European Patent Office, European Search Report, Application No. EP 97 30 9471, mailed on Apr. 23, 1998, 3 pages.

(List continued on next page.)

*Primary Examiner*—Tod R. Swann
*Assistant Examiner*—David Bryan Ransom
*Attorney, Agent, or Firm*—Proskauer Rose LLP

[57] ABSTRACT

Distributed shared memory systems and processes that can connect into each node of a computer network to encapsulate the memory management operations of the connected nodes and to provide thereby an abstraction of a shared virtual memory that can span across each node of the network and that optionally spans across each memory device connected to the computer network. Accordingly, each node on the network having the distributed shared memory system of the invention can access the shared memory.

23 Claims, 7 Drawing Sheets

OTHER PUBLICATIONS

Patent Cooperation Treaty, International Search Report, International Application No. PCT/US97/21457, mailed on Apr. 23, 1998, 4 pages.

Patent Cooperation Treaty, International Search Report, International Application No. PCT/US97/21458, mailed on Apr. 23, 1998, 3 pages.

Patent Cooperation Treaty, International Search Report, International Application No. PCT/US97/21459, mailed on Apr. 23, 1998, 4 pages.

Patent Cooperation Treaty, International Search Report, International Application No. PCT/US97/21460, mailed on Apr. 23, 1998, 5 pages.

Patent Cooperation Treaty, International Search Report, International Application No. PCT/US97/21466, mailed on Apr. 23, 1998, 3 pages.

Patent Cooperation Treaty, International Search Report, International Application No. PCT/US97/21733, mailed on Apr. 23, 1998, 3 pages.

Patent Cooperation Treaty, International Search Report, International Application No. PCT/US97/21734, mailed on Apr. 23, 1998, 4 pages.

Anderson, T., et al. "Serverless Network File Systems," *Operating Systems Review* (SIGOPS), vol. 29, No. 5, Dec. 1, 1995, pp. 109–126.

Carter, J., et al. "Network Multicomputing Using Recoverable Distributed Shared Memory," *Proceedings of the Spring Computer Society International Conference* (COMPCON), San Francisco, Feb. 22–26, 1993, pp. 519–527.

Huber, J., et al. "PPFS: A High Performance Portable Parallel File System," *Proceedings of the International Conference on Supercomputing,* Barcelona, Jul. 3–7, 1995, pp. 385–394.

"Java Dynamic Class Loader," *IBM Technical Disclosure Bulletin,* vol. 39, No. 11, Nov. 1996, pp. 107–108.

Lee, E., et al. "Petal: Distributed Virtual Disks," *7th International Conference on Architectural Support for Programming Languages and Operation Systems,* Cambridge, MA, Oct. 1–5, 1996, pp. 84–92.

Neal, D. "The Harvest Object Cache in New Zealand," *Computer Networks and ISDN Systems,* vol. 11, No. 28, May 1996, pp. 1415–1430.

Raghaven, G. "A Domain Model of WWW Browsers," *Proceedings of Southeastcon, Bringing Together Education, Science and Technology,* Tampa, Apr. 11–14, 1996, pp. 436–439.

Ng, T. "The Design and Implementation of a Reliable Distributed Operating System –ROSE," *Proceedings of the Symposium on Reliable Distributed Systems,* Huntsville, Oct. 9–11, 1990, pp. 2–11.

Yeung, D., et al. "MGS" A Multigran Shared Memory System, *Computer Architecture News,* vol. 24, No. 2, May 1, 1996, pp. 44–55.

Wilson, Andrew W., "Organization and Statistical Stimulation of Hierarchial Multiprocessors," UMI Dissertation Information Service (1985).

Li, Kai, "Shared Virtual Memory on Loosely Coupled Multiprocessors," Yale University, Department of Computer Science, (Sep. 1986).

Wilson, Andrew W., "Hierachical Cache/Bus Architecture for Shared Memory Multiprocessors," *ACM,* pp. 244–252 (1987).

Carter, J.B. et al., "Optimistic Implementation of Bulk Data Transfer Protocols," *In Proceedings of the 1989 Signetrics Conference,* pp. 61–69 (May, 1989).

Carter, J.B. et al., "Distributed Operating Systems Based on a Protected Global Virtual Address Space," In the Proceedings of the Third Workshop on Workstation Operating Systems (WWOS) (May, 1992).

Carter, J.B. et al., "FLEX: A Tool for Building Efficient and Flexible Systems," In the Proceedings of the Fourth Workshop on Workstation Operating Systems (WWOS) (Oct., 1993).

Carter, John B., "Design of the Munin Distributed Shared memory System," To appear in the special issue of the *Journal of Parallel and Distributed Computing* on distributed shared memory (1995).

Carter, J.B. et als., "Techniques for Reducing Consistency–Related Communication in Distributed Shared Memory Systems," *ACM Transactions on Computer Systems,* pp. 205–243, vol. 13, No. 3 (Aug., 1995).

Carter, J.B. et als., "Reducing Consistency Traffic and Cache Misses in the Avalanche Multiprocessor," University of Utah technical report.

SHARED MEMORY COMPUTER NETWORKS

FIELD OF THE INVENTION

The invention relates to computer systems, and more particularly, to computer networking systems and methods that provide shared memory systems and services.

BACKGROUND OF THE INVENTION

The conventional computer network includes a number of client computers connected together and further connected to a server computer that stores the data and the programs that client computers employ during network operation. This configuration is generally referred to as a client-server network. Typically, each client is a conventional computer system that includes a private main memory, typically a RAM memory, and a persistent storage, typically a hard disk. The server is usually an expensive high end machine that includes a high speed processor unit and a large memory, often having ten to one hundred times more storage than the individual client computers. The clients and server cooperate to share data and services among the different users, and to thereby make the individual computers appear as a unified distributed system.

To this end, the server acts as a central controller that provides through its large memory a central repository of network data, and that distributes services to the individual client computers, generally on an as-available basis. Typically, these services are provided by means of specialized software running on a high speed processor.

Although computer networks based on this client-server model have generally been successful at providing users with necessary computer services, as the user demands on computer systems have increased, the weaknesses in the client-server network are beginning to place limits on the services that can be provided.

An additional problem with the client-server network is that it provides a static operating environment that is set for optimal performance at a certain level of network activity. Consequently, the client-server network fails to exploit available resources to improve system performance. In particular, as the system activity rises above or drops below the expected level of network activity, the static operating environment lacks any ability to reconfigure dynamically the allocation of network resources to one providing better performance for the present level of activity.

Moreover, the client-server computer network requires that computer programs written to operate on the client-server network distribute themselves between clients and the server. This requires that the application programs implement a set of functions that divide the program between the clients and the server. This distribution of the application programs requires that the client-server application programs be quite complex. For example, a client-server computer program that shares data between different machines must include functionality that allows for the distribution of multiple copies of data files, the maintenance of coherency for the distributed copies, and other such low-level management services.

Further troubling is that the client-server network stores all important applications and data files in the memory of the server system. Consequently, the client-server network is subject to complete system failure each time the server system crashes.

For the above reasons, among others, the present client-server computer architecture fails to provide an adequate response to the increased demands of today's computer users.

Accordingly, it is an object of the invention to provide improved computer systems.

A further object of the invention is to provide computer network systems that have adaptable system configurations for dynamically exploiting distributed resources and thereby increasing network productivity.

It is a further object of the invention to provide computer network systems that eliminate the need for application programs to provide low-level memory management services across two or more distributed nodes.

It is still a further object of the invention to provide computer network systems that have improved fault tolerance and that are more readily scaleable for adding additional workstations as well as for the interconnection of two or more networks.

Further objects of the present invention shall be seen from the following description of certain illustrated embodiments.

SUMMARY OF THE INVENTION

The invention provides systems that can create and manage a virtual memory space that can be shared by each computer on a network and can span the storage space of each memory device connected to the network. Accordingly, all data stored on the network can be stored within the virtual memory space and the actual physical location of the data can be in any of the memory devices connected to the network.

More specifically, the system can create or receive, a global address signal that represents a portion, for example 4K bytes, of the virtual memory space. The global address signal can be decoupled from, i.e. unrelated to, the physical and virtual address spaces of the underlying computer hardware, to provide support for a memory space large enough to span each volatile and persistent memory device connected to the system. For example, systems of the invention can operate on 32-bit computers;, but can employ global address signals that can be 128 bits wide. Accordingly, the virtual memory space spans $2^{128}$ bytes, which is much larger than the $2^{32}$ address space supported by the underlying computer hardware. Such an address space can be large enough to provide a separate address for every byte of data storage on the network, including all RAM, disk and tape storage.

For such a large virual memory space, typically only a small portion is storing data at any time. Accordingly, the system includes a directory manager that tracks those portions of the virtual memory space that are in use. The system provides physical memory storage for each portion of the virtual memory space in use by mapping each such portion to a physical memory device, such as a RAM memory or a hard-drive. Optionally, the mapping includes a level of indirection that facilitates data migration, fault-tolerant operation, and load balancing.

By allowing each computer to monitor and track which portions of the virtual memory space are in use, each computer can share the memory space. This allows the networked computers to appear to have a single memory, and therefore can allow application programs running on different computers to communicate using techniques currently employed to communicate between applications running on the same machine.

In one aspect, the invention can be understood to include computer systems having a shared addressable memory space. The systems can comprise a data network that carries data signals representative of computer readable information a persistent memory device that couples to the data network and that provides persistent data storage, and plural computers that each have an interface that couples to the data network, for accessing the data network to exchange data signals therewith. Moreover, each of the computers can include a shared memory subsystem for mapping a portion of the addressable memory space to a portion of the persistent storage to provide addressable persistent storage for data signals.

In a system that distributes the storage across the memory devices of the network, the persistent memory device will be understood to include a plurality of local persistent memory devices that each couple to a respective one of the plural computers. To this same end, the system can also include a distributor for mapping portions of the addressable memory space across the plurality of local persistent memory devices and a disk directory manager for tracking the mapped portions of said addressable memory space to provide information representative of the local persistent memory device that stores that portion of said addressable memory space mapped thereon.

The systems can also include a cache system for operating one of the local persistent memory devices as a cache memory for cache storing data signals associated with recently accessed portions of the addressable memory space. Further the system can include a migration controller for selectively moving portions of the addressable memory space between the local persistent memory devices of the plural computers. The migration controller can determine and respond to data access patterns, resource demands or any other criteria or heuristic suitable for practice with the invention. Accordingly, the migration controller can balance the loads on the network, and move data to nodes from which it is commonly accessed. The cache controller can be a software program running on a host computer to provide a software managed RAM and disk cache. The RAM can be any volatile memory including SRAM, DRAM or any other volatile memory. The disk can be any persistent memory including any disk, RAID, tape or other device that provides persistent data storage.

The systems can also include a coherent replication controller for generating a copy, or select number of copies, of a portion of the addressable memory space maintained in the local persistent memory device of a first computer and for storing the copy in the local persistent memory device of a second computer. The coherent replication controller can maintain the coherency of the copies to provide coherent data replication.

The systems can also be understood to provide integrated control of data stored in volatile memory and in persistent memory. In such systems a volatile memory device has volatile storage for data signals, and the shared memory subsystem includes an element, typically a software module, for mapping a portion of the addressable memory space to a portion of the volatile storage. In these systems the volatile memory device can be comprised of a plurality of local volatile memory devices each coupled to a respective one of the plural computers, and the persistent memory device can be comprised of a plurality of local persistent memory devices each coupled to a respective one of the plural computers.

In these systems, a directory manager can track the mapped portions of the addressable memory space, and can include two sub-components; a disk directory manager for tracking portions of the addressable memory space mapped to the local persistent memory devices, and a RAM directory manager for tracking portions of the addressable memory space mapped to the local volatile memory devices. Optionally, a RAM cache system can operate one of the local volatile memory devices as a cache memory for cache storing data signals associated with recently accessed portions of the addressable memory space.

The systems can include additional elements including a paging element for remapping a portion of the addressable memory space between one of the local volatile memory devices and one of the local persistent memory devices; a policy controller for determining a resource available signal representative of storage available on each of the plural computers and, a paging element that remaps the portion of addressable memory space from a memory device of a first computer to a memory device of a second computer, responsive to the resource available signal; and a migration controller for moving portions of addressable memory space between the local volatile memory devices of the plural computers.

Optionally, the systems can include a hierarchy manager for organizing the plural computers into a set of hierarchical groups wherein each group includes at least one of the plural computers. Each the group can include a group memory manager for migrating portions of addressable memory space as a function of the hierarchical groups.

The system can maintain coherency between copied portions of the memory space by including a coherent replication controller for generating a coherent copy of a portion of addressable memory space.

The system can generate or receive global address signals. Accordingly the systems can include an address generator for generating a global address signal representative of a portion of addressable memory space. The address generator can include a spanning unit for generating global address signals as a function of a storage capacity associated with the persistent memory devices, to provide global address signals capable of logically addressing the storage capacity of the persistent memory devices.

In distributed systems, the directory manager can be a distributed directory manager for storing within the distributed memory space, a directory signal representative of a storage location of a portion of the addressable memory space. The distributed directory manager can include a directory page generator for allocating a portion of the addressable memory space and for storing therein an entry signal representative of a portion of the directory signal. The directory page generator optionally includes a range generator for generating a range signal representative of a portion of the addressable memory space, and for generating the entry signal responsive i:o the range signal, to provide an entry signal representative of a portion of the directory signal that corresponds to the portion of the addressable memory space. Moreover, the distributed directory manager can include a linking system for linking the directory pages to form a hierarchical data structure of the linked directory pages as well as a range linking system for linking the directory pages, as a function of the range signal, to form a hierarchical data structure of linked directory pages.

As the data stored by the system can be homeless, in that the data has no fixed physical home, but can migrate, as resources and other factors dictate, between the memory devices of the network, a computer system according to the invention can include a directory page generator that has a node selector for generating a responsible node signal representative of a select one of the plural computers having location information for a portion of the shared address space. This provides a level of indirection that decouples the directory from the physical storage location of the data. Accordingly, the directory needs only to identify the node, or other device, that tracks the physical location of the data. This way, each time data migrates between physical storage locations, the directory does not have to be updated, since the node tracking the location of the data has not changed and still provides the physical location information.

Accordingly, the system can include page generators that generate directory pages that carry information representative of a location monitor, such as a responsible computer node, that tracks a data storage location, to provide a directory structure for tracking homeless data. Moreover, the directory itself can be stored as pages within the virtual memory space. Therefore, the data storage location can store information representative of a directory page, to store the directory structure as pages of homeless data.

In another aspect, the invention can be understood as methods for providing a computer system having a shared addressable memory space. The method can include the steps of providing a network for carrying data signals representative of computer readable information, providing a hard-disk, coupled to the network, and having persistent storage for data signals, providing plural computers, each having an interface, coupled to the data network, for exchanging data signals between the plural computers, and assigning a portion of the addressable memory space to a portion of the persistent storage of the hard disk to provide addressable persistent storage for data signals.

BRIEF DESCRIPTION OF THE ILLUSTRATED EMBODIMENTS

DETAILED DESCRIPTION OF THE ILLUSTRATED EMBODIMENTS

Figure 1:
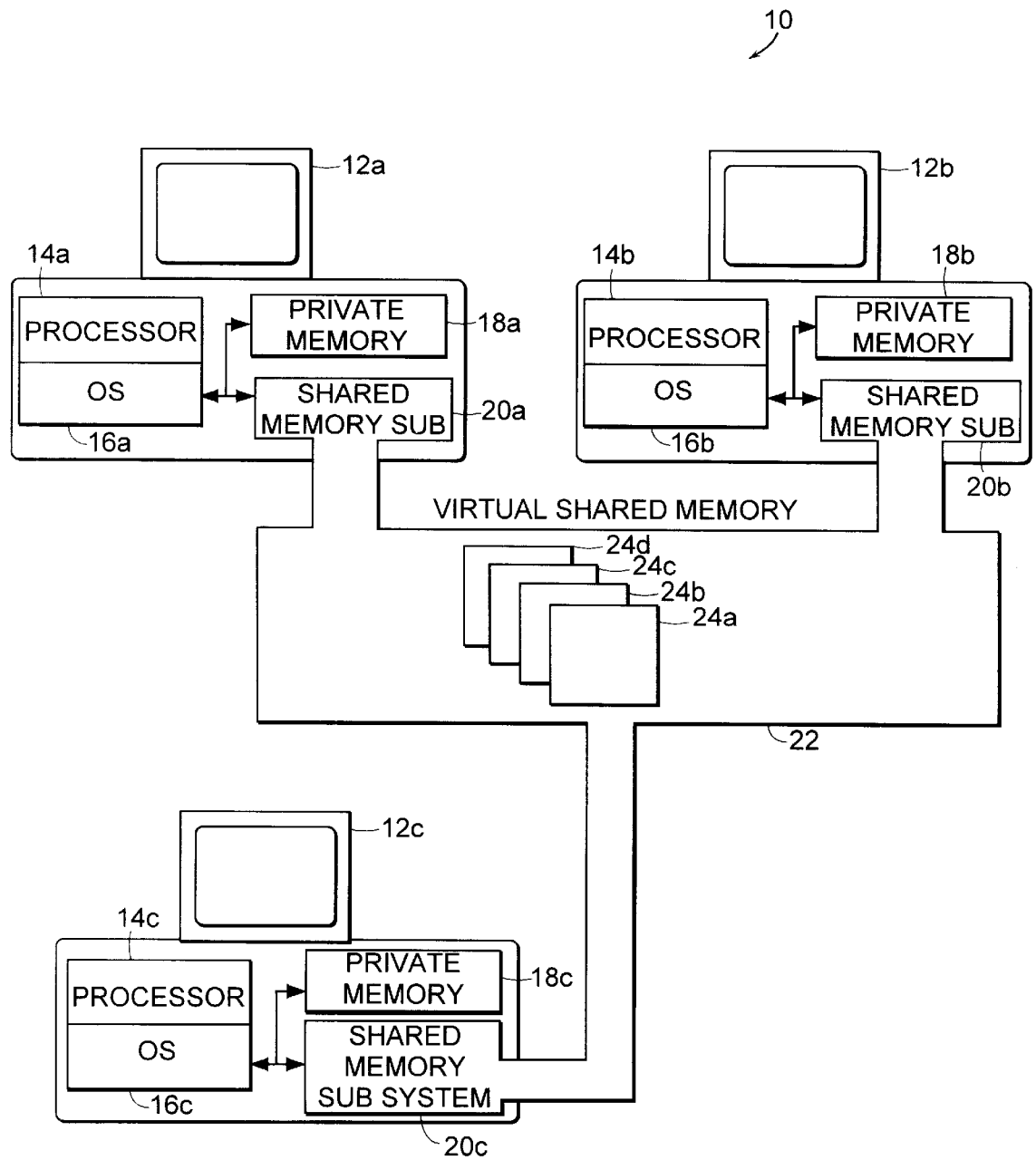
FIG. 1 illustrates a distributed shared memory computer network according to the invention.

FIG. 1 illustrates a computer network 10 that provides a shared memory that spans the memory space of each node of the depicted computer network 10.

Specifically, FIG. 1 illustrates a computer network 10 that includes a plurality of nodes 12a–12c, each having a CPU 14, an operating system 16, an optional private memory device 18, and a shared memory subsystem 20. As further depicted in by FIG. 1, each node 12a–12c connects via the shared memory subsystem 20 to a virtual shared memory 22. As will be explained in greater detail hereinafter, by providing the shared memory subsystem 20 that allows the node 12a–12c to access the virtual shared memory 22, the computer network 10 enables network nodes 12a–12c to communicate and share functionality using the same techniques employed by applications when communicating between applications running on the same machine. These techniques can employ object linking and embedding, dynamic link libraries, class registering, and other such techniques. Accordingly, the nodes 12 can employ the virtual shared memory 22 to exchange data and objects between application programs running on the different nodes 12 of the network 10.

In the embodiment depicted in FIG. 1, each node 12 can be a conventional computer system such as a (commercially available IBM PC compatible computer system. The processor 14 can be any processor unit suitable for performing the data processing for that computer system. The operating system 16 can be any commercially available or proprietary operating system that includes, or can access, functions for accessing the local memory of the computer system and networking.

The private memory device 18 can be any computer memory device suitable for storing data signals representative of computer readable information. The private memory provides the node with local storage that can be kept inaccessible to the other nodes on the network. Typically the private memory device 18 includes a RAM, or a portion of a RAM memory, for temporarily storing data and application programs and for providing the processor 14 with memory storage for executing programs. The private memory device 18 can also include persistent memory storage, typically a hard disk unit or a portion of a hard disk unit, for the persistent storage of data.

The shared memory subsystem 20 depicted in FIG. 1 is an embodiment of the invention that couples between the operating system 16 and the virtual shared memory 22 and forms an interface between the operating system 16 and the virtual shared memory to allow the operating system 16 to access the virtual shared memory 22. The depicted shared memory subsystem 20 is a software module that operates as a stand-alone distributed shared memory engine. The depicted system is illustrative and other systems of the invention can be realized as shared memory subsystems that can be embedded into an application program, or be implemented as an embedded code of a hardware device. Other such applications can be practiced without departing from the scope of the invention.

The depicted virtual shared memory 22 illustrates a virtual shared memory that is accessible by each of the nodes 12a–12c via the shared memory subsystem 20. The virtual shared memory 22 can map to devices that provide physical storage for computer readable data, depicted in FIG. 1 as a plurality of pages 24a–24d. In one embodiment, the pages form portions of the shared memory space and divide the address space of the shared memory into page addressable memory spaces. For example the address space can be paged into 4K byte sections. In other embodiments alternative granularity can be employed to manager the shared memory space. Each node 12a–12c through the shared memory subsystem 20 can access each page 24a–24d slored in the virtual shared memory 22. Each page 24a–24d represents a unique entry of computer data stored within the virtual shared memory 22. Each page 24a–24d is accessible to each one of the nodes 12a–12c, and alternatively, each node can store additional pages of data within the virtual shared memory 22. Each newly stored page of data can be accessible to each of the other nodes 12a–12c. Accordingly, the virtual shared memory 22 provides a system for sharing and communicating data between each node 12 of the computer network 10.

Figure 2:
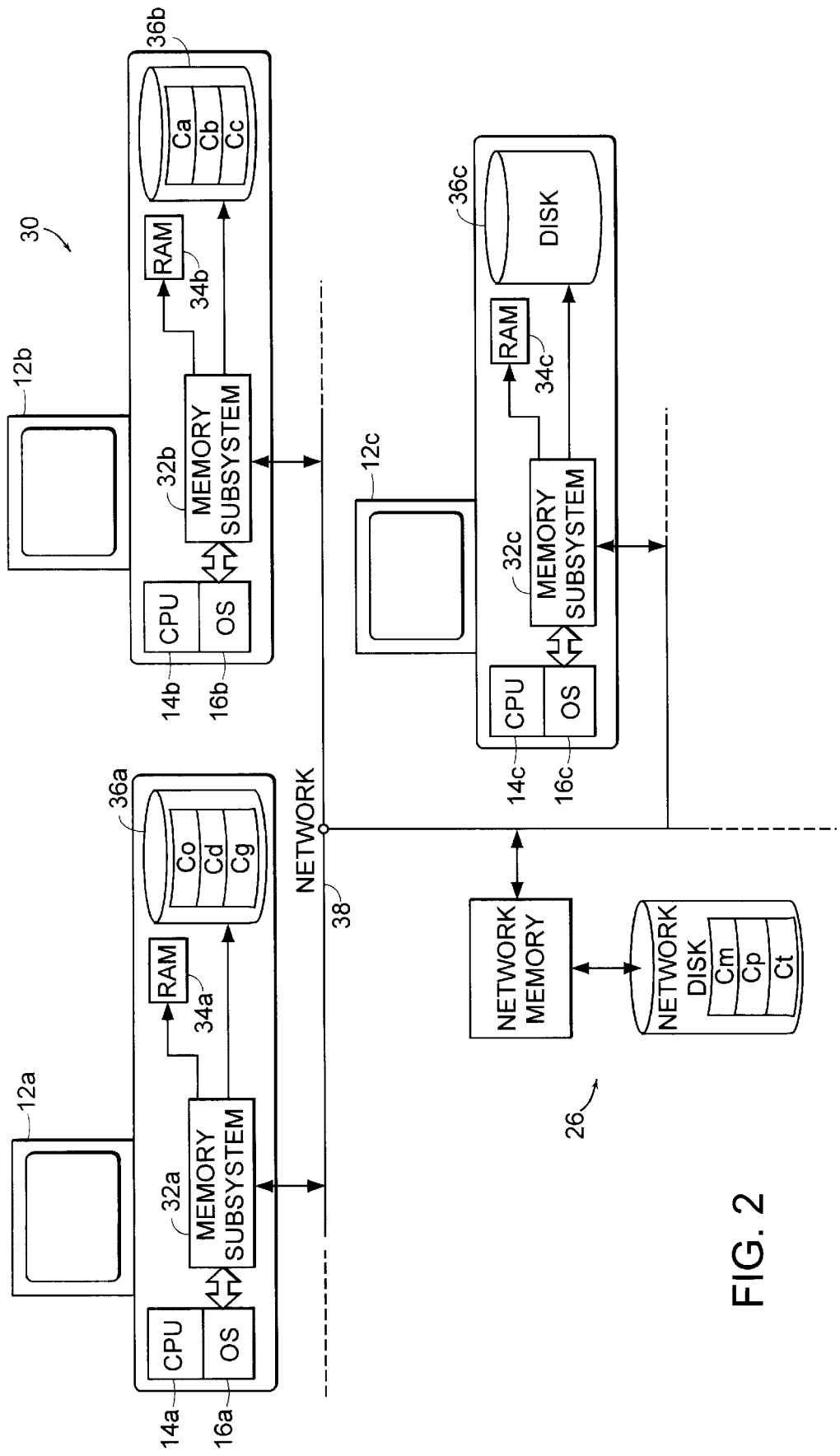
FIG. 2 is a functional block diagram that illustrates in more detail one distributed shared memory computer network of the type shown in FIG. 1.

FIG. 2 illustrates in functional block diagram form a computer network 30 that has a distributed shared memory. In this embodiment, each node 12a–12c has a memory subsystem 32 that connects between the operating system 16 and the two local memory devices, the RAM 34 and the disk 36, and that further couples to a network 38 that couples to each of the depicted nodes12a,12b and 12c and to a network memory device 26.

More particularly, FI G. 2 illustrates a distributed shared memory network 30 that includes a plurality of nodes 12a,12b and 12c, each including a processing unit 14, an operating system 16, a memory subsystem 32, a RAM 34, and a disk 36. FIG. 2 further depicts a computer network system 38 that connects between the nodes 12a,12b and 12c and the network memory device 26. The network 38 provides a network communication system across these elements.

The illustrated memory subsystems 32a–32c that connect between the operating system 16a–16c, the memory elements 34a–34c, 36a–36c, and the network 38, encapsulate the local memories of each of the nodes to provide an abstraction of a shared virtual memory system that spans across each of the nodes 12a, 12b and 12c on the network 38. The memory subsystems 32a–32c can be software modules that act as distributors to map portions of the addressable memory space across the depicted memory devices. The memory subsystems further track the data stored in the local memory of each node 12 and further operate network connections with network 38 for transferring data between the nodes 12a–12c. In this way, the memory subsystems 32a–32c access and control each memory element on the network 38 to perform memory access operations that are transparent to the operating system 16. Accordingly, the operating system 16 interfaces with the memory subsystem 32 as an interface to a global memory space that spans each node 12a–12c on the network 38.

FIG. 2 further depicts; that the system 30 provides a distributed shared memory that includes persistent storage for portions of the distributed memory. In particular, the depicted embodiment includes a memory subsystem, such as subsystem 32a, that interfaces to a persistent memory device, depicted as the disk 36a. The subsystem 32a can operate the persistent memory device to provide persistent storage for portions of the distributed shared memory space. As illustrated, each persistent memory device 36 depicted in FIG. 2 has a portion of the addressable memory space mapped onto it. For example, device 36a has the portions of the addressable memory space, $C_o$, $C_d$, $C_g$, mapped onto it, and provides persistent storage For data signals stored in those ranges of addresses.

Accordingly, the subsystem 32a can provide integrated control of persistent storage devices and electronic memory to allow the distributed shared memory space to span across both types of storage devices, and to allow portions of the distributed shared memory to move between persistent and electronic memory depending on predetermined conditions, such as recent usage.

In one optional embodiment, the nodes of the network are organized into a hierarchy of groups. In this embodiment, the memory subsystems 32a–32c can include a hierarchy manager that provides hierarchical control for the distribution of data. This includes controlling the migration controller, and policy controller, which are discussed in detail below, to perform hierarchical data migration and load balancing, such that data migrates primarily between computers of the same group, and passes to other groups in hierarchical order. Resource distribution is similarly managed.

Figure 3:
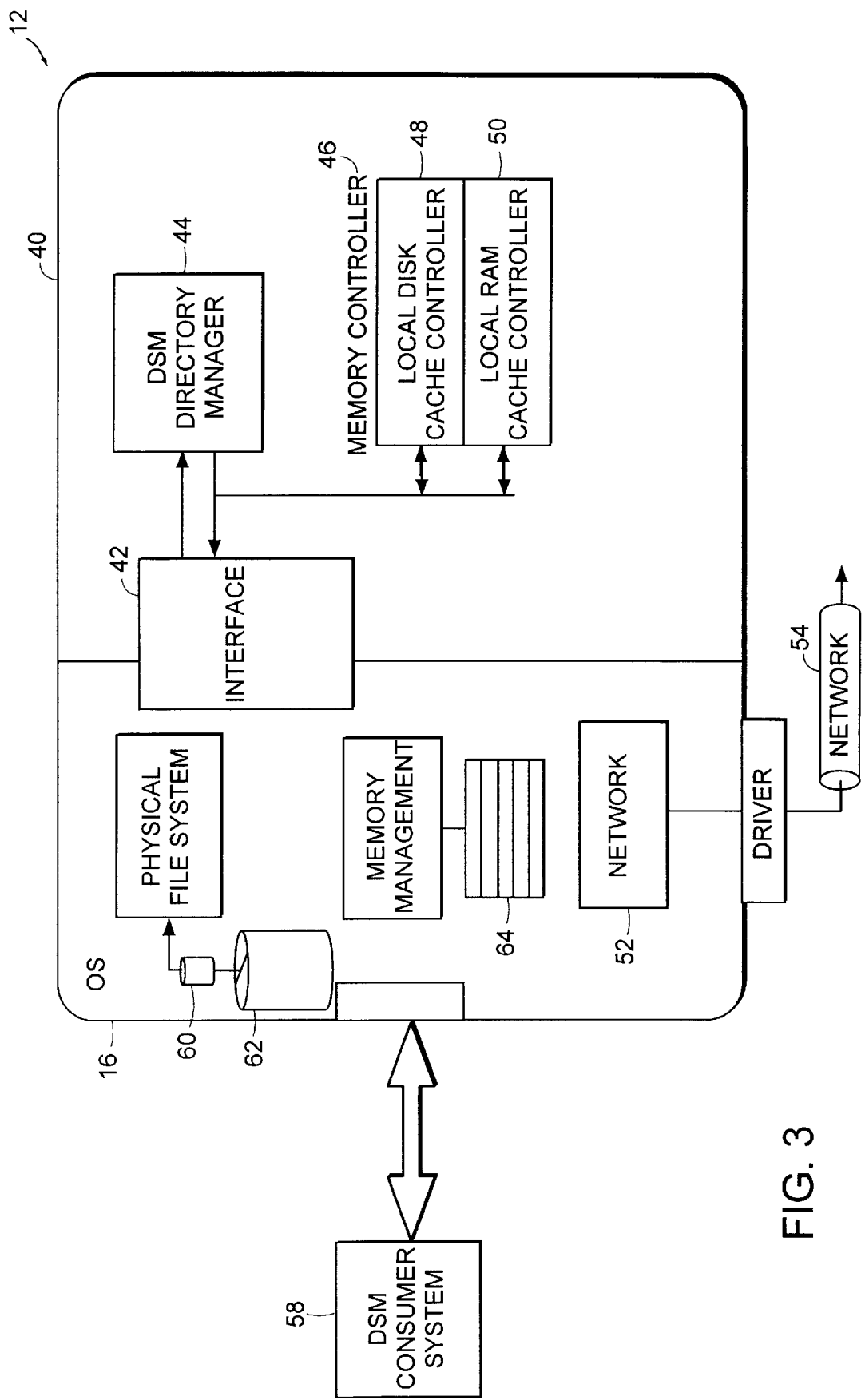
FIG. 3 illustrates in more detail a shared memory subsystem suitable for practice with the network illustrated in FIG. 2.

FIG. 3 illustrates in more detail one shared memory subsystem 40 according to the invention. FIG. 3 depicts a shared memory subsystem 40, that includes an interface 42, a DSM directory manager 44, a memory controller 46, a local disk cache controller 48, and a local RAM cache controller 50. FIG. 3 further depicts the network 54, an optional consumer of the DSM system, depicted as the service 58, the operating system 16, a disk driver 60, a disk element 62 and a RAM element 64.

The shared memory subsystem 40 depicted in FIG. 3 can encapsulate the memory management operations of the network node 12 to provide a virtual shared memory that can span across each node that connects into the network 54. Accordingly, each local node 12 views the network as a set of nodes that are each connected to a large shared computer memory.

The depicted interface 42 provides an entry point for the local node to access the shared memory space of the computer network. The interface 42 can couple directly to the operating system 16, to a distributed service utility such as the depicted DSM file system 58, to a distributed user-level service utility, or alternatively to any combination thereof.

The depicted interface 42 provides an API that is a memory oriented API. Thus, the illustrated interface 42 can export a set of interfaces that provide low-level control of the distributed memory. As illustrated in FIG. 3, the interface 42 exports the API to the operating system 16 or to the optional DSM service 58. The operating system 16 or the service employs the interface 42 to request standard memory management techniques, such as reading and writing from portions of the memory space. These portions of the memory space can be the pages as described above which can be 4K byte portions of the shared memory space, or other units of memory, such as objects or segments. Each page can be located within the shared memory space which is designated by a global address signal for that page of memory. The system can receive address signals from an application program or, optionally, can include a global address generator that generates the address signals. The address generator can include a spanning module that generates address signals for a memory space that spans the storage capacity of the network.

Accordingly, in one embodiment, the interface 42 receives requests to manipulate pages of the shared memory space. To this end, the interface 42 can comprise a software module that includes a library of functions that can be called by services, the OS 16, or other caller, or device. The function calls provide the OS 16 with an API of high level memory oriented services, such as read data, write data, and allocate memory. The implementation of the functions can include a set of calls to controls that operate the directory manager 44, and the local memory controller 46. Accordingly, the interface 42 can be a set of high level memory function calls to interface to the low-level functional elements of shared memory subsystem 40.

FIG. 3 further depicts a DSM directory manager 44 that couples to the interface 42. The interface 42 passes request signals that represent requests to implement memory operations such as allocating a portion of memory, locking a portion of memory, mapping a portion of memory, or some other such memory function. The directory manager 44 manages a directory that can include mappings than can span across each memory device connected to the network 38 depicted in FIG. 2, including each RAM and disk element accessible by the network. The directory manager 44 stores a global directory structure that provides a map of the global address space. In one embodiment as will be explained in greater detail hereinafter, the directory manager 44 provides a global directory that maps between global address signals and responsible nodes on the network. A responsible node stores information regarding the location and attributes of data associated with a respective global address, and optionally stores a copy of that page's data. Consequently, the directory manager 44 tracks information for accessing any address location within the virtual address space.

The control of the distributed shared memory can be coordinated by the directory manager 44 and the memory controller 46. The directory manager 44 maintains a directory structure that can operate on a global address received from the interface 42 and identify, for that address, a node on the network that is responsible for maintaining the page associated with that address of the shared memory space. Once the directory manager 44 identifies which node is responsible for maintaining a particular address, the directory manager 44 can identify a node that stores information for locating a copy of the page, and make the call to the memory controller 46 of that node and pass to that node's memory controller the memory request provided by the memory interface 42. Accordingly, the depicted directory manager 44 is responsible for managing a directory structure that identifies for each page of the shared memory space a responsible node that tracks the physical location of the data stored in the respective page. Thus, the directory, rather than directly providing the location of the page, can optionally identify a responsible node, or other device, that tracks the location of the page. This indirection facilitates maintenance of the directory as pages migrate between nodes.

The memory controller 46 performs the low level memory access functions that physically store data within the memory elements connected to the network. In the depicted embodiment, the directory manager 44 of a first node can pass a memory access request through the interface 42, to the network module of the OS 16, and across the network 54 to a second node that the directory manager 44 identifies as the responsible node for the given address. The directory manager 44 can then query the responsible node to determine the attributes and the current owner node of the memory page that is associated with the respective global address. The owner of the respective page is the network node that has control over the memory storage element on which the data of the associated page is stored. The memory controller 46 of the owner can access, through the OS 16 of that node or through any interface, the memory of the owner node to access the data of the page that is physically stored on that owner node.

In particular, as depicted in FIG. 3, the directory manager 44 couples to the network module 52 which couples to the network 54. The directory manager can transmit to the network module 52 a command and associated data that directs the network interface 52 to pass a data signal to the owner node. The owner node receives the memory request across network 54 and through network module 52 that passes the memory request to the interface 42 of that owner node. The interface 42 couples to the memory controller 46 and can pass the memory request to the local memory controller of that owner node for operating the local storage elements, such as the disk or RAM elements, to perform the requested memory operation.

Once the owner node has performed the requested memory operation, such as reading a page of data, the memory subsystem 40 of the owner node can then transfer the page of data, or a copy of the page of data, via the network 54 to the node that originally requested access to that portion of the shared memory. The page of data is transferred via the network 54 to the network module 52 of the requesting node and the shared memory subsystem 40 operates the memory controller 46 to store in the local memory of the requesting node a copy of the accessed data.

Accordingly, in one embodiment of the invention, when a first node accesses a page of the shared memory space which is not stored locally on that node, the directory manager 4 identifies a node that has a copy of the data stored in that page and moves a copy of that data into the local memory of the requesting node. The local memory storage, both volatile and persistent, of the requesting node therefore becomes a cache for pages that have been requested by that local node. This embodiment is depicted FIG. 3 which depicts a memory controller that has a local disk cache controller 48 and a local RAM cache controller 50. Both of these local cache controllers can provide to the operating system 16, or other consumer pages of the shared memory space that are cache stored in the local memory of the node, including local persistent memory and local volatile memory.

The shared memory subsystem can include a coherent replication controller that maintains coherency between cached pages by employing a coherence through invalidation process, a coherence through migration process or other coherence process suitable for practice with the present invention. The coherent replication controller can automatically generate a copy of the data stored in each page and can store the copy in a memory device that is separate from the memory device or the original copy. This provides for fault tolerant operation, as the failure of any one memory device will not result in the loss of data. The coherent replication controller can be a software model that monitors all copies of pages kept in volatile memory and made available for writing. The controller can employ any of the coherency techniques named above, and can store tables of location information that identifies the location information for all generated copies.

Figure 4:
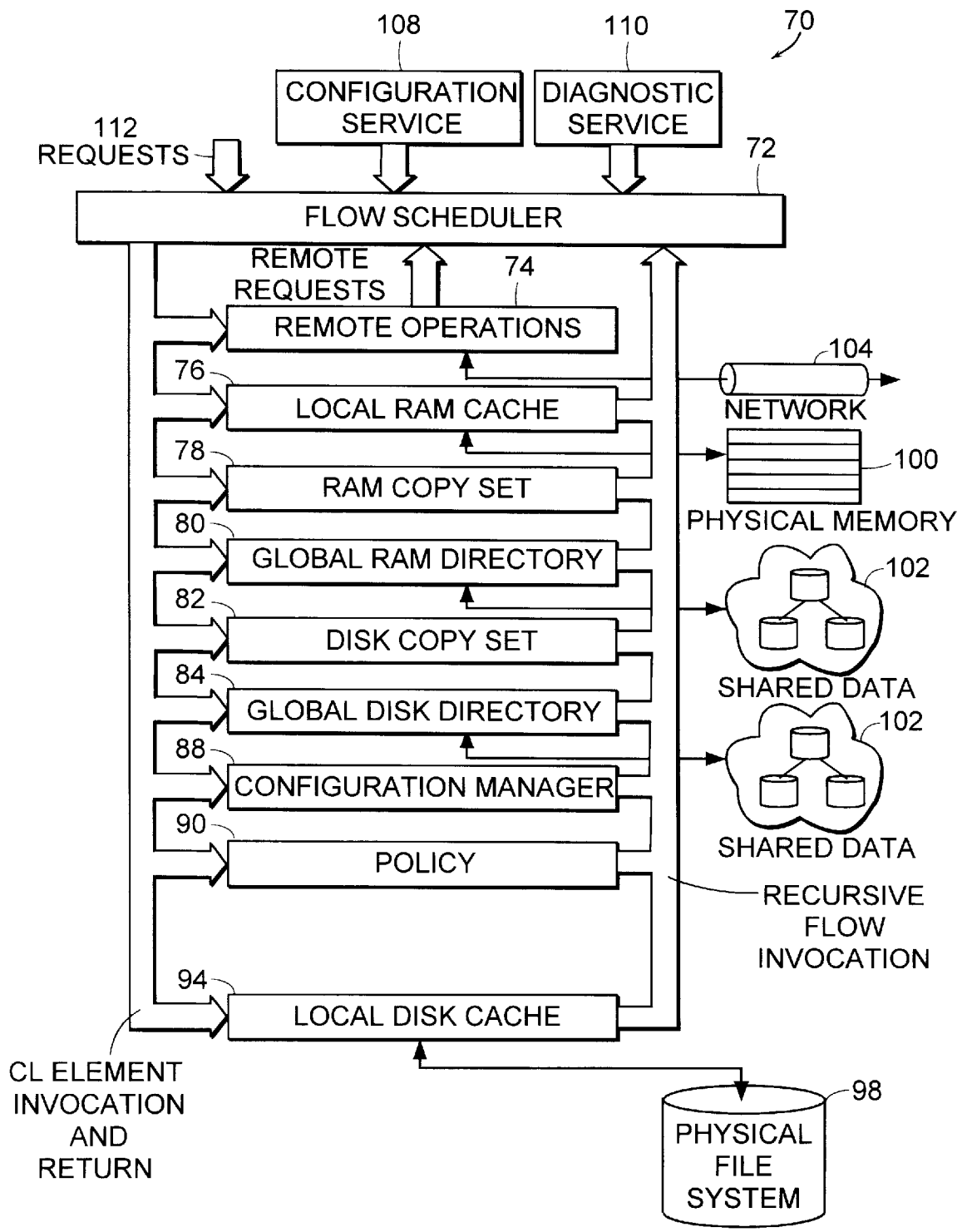
FIG. 4 is a functional block diagram of one shared memory subsystem according to the invention.

FIG. 4 illustrates in greater detail one embodiment of a shared memory subsystem according to the invention. The shared memory subsystem 70 depicted in FIG. 4 includes a remote operations element 74, a local RAM cache 76, a RAM copyset 78, a global RAM directory 80, a disk copyset 82, a global disk directory 84, a configuration manager 88, a policy element 90, and a local disk cache 94. FIG. 4 further depicts a network element 104, a physical memory 100, shared data element 102, a physical file system 98, which is part of the operating system 16, a configuration service 108, a diagnostic service 110, and a memory access request 112. The depicted subsystem 70 can be a computer program that couples to the physical memory, file system, and network system of the host node, or can be electrical circuit card assemblies that interface to the host node, or can be a combination of programs and circuit card assemblies.

The flow scheduler 72 depicted in FIG. 4 can orchestrate the controls provided by an API of the subsystem 70. In one embodiment, the flow scheduler 72 can be a state machine that monitors and responds to the requests 112 and remote requests through network 104 which can be instructions for memory operations and which can include signals representative of the global addresses being operated on. These memory operation requests 112 can act as op-codes for primitive operations on one or more global addresses. They can be read and write requests, or other memory operations.

Alternatively, the flow scheduler 72 can be a program, such as an interpreter, that provides an execution environment and can map these op-codes into control flow programs called applets. The applets can be independent executable programs that employ both environment services, such as threading, synchronization, and buffer management, and the elements depicted in FIG. 4. The API is capable of being called from both external clients, like a distributed shared memory file system, as well as recursively by the applets and the other elements 74–94 of the subsystem 70. Each element can provide a level of encapsulation to the management of a particular resource or aspect of the system. To this end, each element can export an API consisting of functions to be employed by the applets. This structure is illustrated in FIG. 4. Accordingly, the flow scheduler 72 can provide an environment to load and execute applets. The applets are dispatched by the flow scheduler 72 on a per op-code basis and can perform the control flow for sequential or parallel execution of an element to implement the op-code on the specified global address, such as a read or write operation. Optionally, the flow scheduler 72 can include an element to change dynamically the applet at run time as well as execute applets in parallel and in interpreted mode.

The depicted shared memory subsystem 70 includes a bifurcated directory manager that includes the global RAM directory 80 and the global disk directory 84. The global RAM directory 80 is a directory manager that tracks information that can provide the location of pages that are stored in the volatile memory, typically RAM, of the network nodes. The global disk directory 84 is a global disk directory manager that manages a directory structure that tracks information that can provide the location of pages that are stored on persistent memory devices. Together, the global RAM directory 80 and the global disk directory 84 provide the shared memory subsystem 70 with integrated directory management for pages that are stored in persistent storage and volatile memory.

In one embodiment a paging element can operate the RAM and disk directory managers to remap portions of the addressable memory space between one of the volatile memories and one of the persistent memories. In the shared memory system, this allows the paging element to remap pages from the volatile memory of one node to a disk memory of another node. Accordingly, the RAM directory manager passes control of that page to the disk directory manager which can then treat the page as any other page of data. This allows for improved load balancing, by removing data from RAM memory, and storing it in the disk devices, under the control of the disk directory manager.

The local memory controller of the subsystem 70 is provided by the local RAM cache 76 and the local disk cache 94. The local RAM cache 76 which couples to the physical memory 100 of the local node can access, as described above, the virtual memory space of the local node to access data that is physically stored within the RAM memory 100. Similarly, the local disk cache 94 couples to the persistent storage device 98 and can access a physical location that maintains in the local persistent storage data of the distributed shared memory.

FIG. 4 also depicts t remote operations element 74 that couples between the network 104 and the flow scheduler 72. The remote operations element 74 negotiates the transfer of data across the network 104 for moving portions of the data stored in the shared memory space between the nodes of the network. The remote operations element 74 can also request services from remote peers, i.e. invalidate to help maintain coherency or for other reasons.

FIG. 4 also depicts a policy element 90 that can be a software module that acts as a controller to determine the availability of resources, such as printer capabilities, harddisk space, available RAM and other such resources. The policy controller can employ any of the suitable heuristics to direct the elements, such as the paging controller, disk directory manager, and other elements to dynamically distribute the available resources.

FIG. 4 further depicts a memory subsystem 70 that includes a RAM copyset 78 and a disk copyset 82. These copysets can manage copies of pages that are cached at a single node. The disk copyset 82 can maintain information on copies of pages that are stored in the local disk cache, which can be the local persistent memory. Similarly the RAM copyset 78 can maintain information on copies of pages that are stored in the local RAM cache which can be the local RAM. These copysets encapsulate indexing and storage of copyset data that can be employed by applets or other executing code for purposes of maintaining the coherency of data stored in the shared memory space. The copyset elements can maintain copyset data that identifies the pages cached by the host node. Further, the copyset can identify the other nodes on the network that maintain a copy of that page, and can further identify for each page which of these nodes is the owner node, wherein the owner node can be a node which has write privileges to the page being accessed. The copysets themselves can be stored in pages of the distributed shared memory space.

The local RAM cache 76 provides storage for memory pages and their attributes. In one embodiment, the local RAM cache 76 provides a global address index for accessing the cached pages of the distributed memory and the attributes based on that page. In this embodiment, the local ram cache 76 provides the index by storing in memory a list of each global address cached in the local RAM. With each listed global address, the index provides a pointer into a buffer memory and to the location of the page data. Optionally, with each listed global address, the index can further provide attribute information including a version tag representative of the version of the data, a dirty bit representative of whether the RAM cached data is a copy of the data held on disk, or whether the RAM cached data has been modified but not yet flushed to disk, a volatile bit to indicate if the page is backed by backing store in persistent memory, and other such attribute information useful for managing the coherency of the stored data.

In the embodiment depicted in FIG. 4, the memory subsystem 70 provides the node access to the distributed memory space by the coordinated operation of the directory manager that includes the global RAM directory 80 and the global disk directory 84, the cache controller that includes the local RAM cache and the local disk cache elements 76 and 94, and the copyset elements which include the RAM copyset 78 and the disk copyset 82.

The directory manager provides a directory structure that indexes the shared address space. Continuing with the example of a paged shared address space, the directory manager of the subsystem 70 allows the host node to access, by global addresses, pages of the shared memory space.

Figure 5:
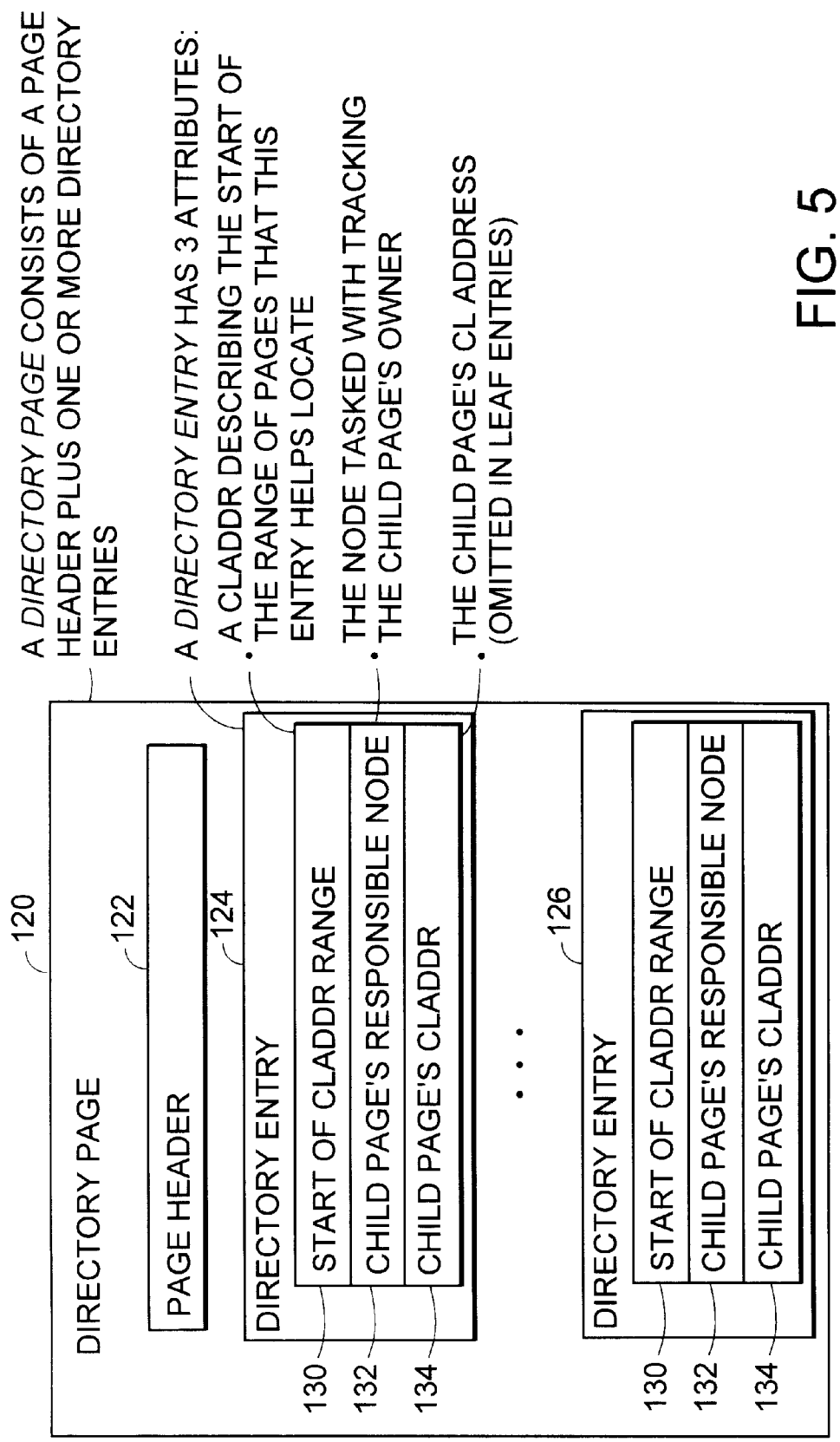
FIG. 5 illustrates a directory page that can be provided by a shared memory subsystem of the type depicted in FIG. 4.
Figure 6:
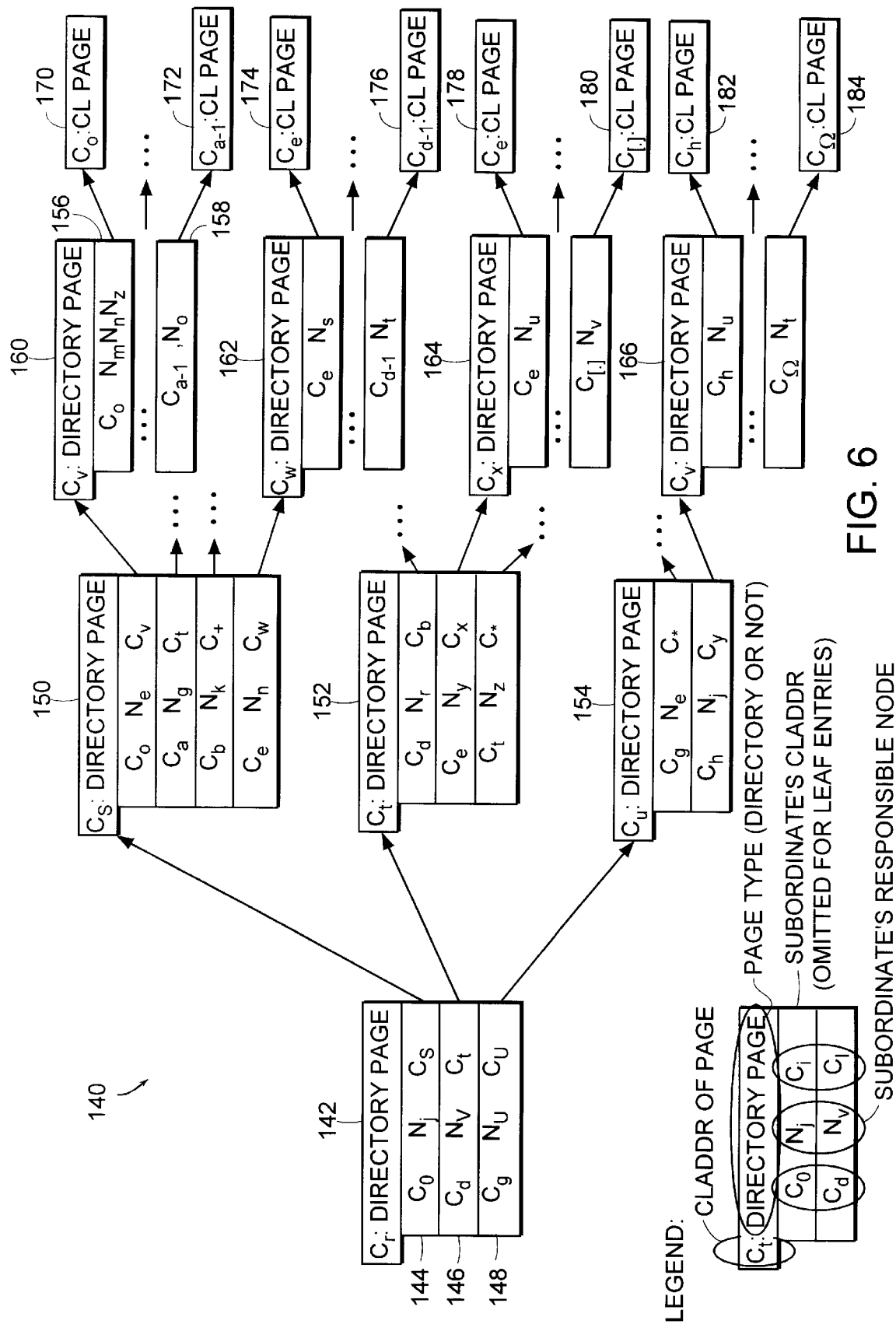
FIG. 6 illustrates a directory that can be distributed within a shared memory and formed of directory pages of the type illustrated in FIG. 5.

FIGS. 5 and 6 illustrate one example of a directory structure that provides access to the shared memory space. FIG. 5 depicts a directory page 120 that includes a page header 122, directory entries 124 and 126, wherein each directory entry includes a range field 130, a responsible node field 132, and an address field 134. The directory pages can be generated by a directory page generator that can be a software module controlled by the directory manager. It will be understood that the directory manager can generate multiple directories, including one for the Global disk and one for the Global RAM directories. The depicted directory page 120 can be a page of the global address space, such as a 4K byte portion of the shared address space. Therefore, the directory page can be stored in the distributed shared memory space just as the other pages to which the directory pages provide access.

As further depicted in FIG. 5, each directory page 120 includes a page header 122 that includes attribute information for that page header, which is typically metadata for the directory page, and further includes directory entries such as the depicted directory entries, 124 and 126, which provide an index into a portion of the shared address space wherein that portion can be one or more pages, including all the pages of the distributed shared memory space. The depicted directory page 120 includes directory entries that index a selected range of global addresses of the shared memory space. To this end, the directory generator can include a range generator so that each directory entry can include a range field 130 that describes the start o f a range of addresses that that entry locates.

Accordingly, each directory page 120 can include a plurality of directory entries, such as entries 124 and 126, that can subdivide the address space into a subset of address ranges. For example, the depicted directory page 120 includes two directory entries 124 and 126. The directory entries 124 and 126 can, for example, subdivide the address space into two sub-portions. In this example, the start address range of the directory entry 124 could be the base address of the address space, and the start address range of the directory entry 126 could be the address for the upper half of the memory space. Accordingly, the directory entry 124 provides an index for pages stored in the address space between the base address and up to the mid-point of the memory space and, in complement thereto, the directory entry 126 provides an index to pages stored in the address space that ranges from the mid-point of the address space to the highest address.

FIG. 5 further depicts a directory page 120 that includes, in each directory entry, a responsible node field 132 and the child page global address field 134. These fields 132, 134 provide further location information for the data stored in pages within the address range identified in field 130.

FIG. 6 depicts a directory 140 formed from directory pages similar to those depicted in FIG. 5. FIG. 6 depicts that the directory 140 includes directory pages 142, 150–154, and 160–166. FIG. 6 further depicts that the directory 140 provides location information to the pages of the distributed shared memory space depicted in FIG. 6 as pages 170–184.

The directory page 142 depicted in FIG. 6 acts like a root directory page and can be located at a static address that is known to each node coupled to the distributed address space. The root directory page 142 includes three directory entries 144, 146, and 148. Each directory entry depicted in FIG. 6 has directory entries similar to those depicted in FIG. 5. For example, directory entry 144 includes a variable Co which-represents the address range field 130, a variable Nj representative of the field 132, and a variable Cs representative of the field 134. The depicted root directory page 142 subdivides the address space into three ranges illustrated as an address range that extends between the address Co and Cd, a second address range that extends between the address Cd and Cg, and a third address range that extends between Cg and the highest memory location of the address space.

As further depicted in FIG. 6, each directory entry 144, 146, and 148 points to a subordinate directory page, depicted as directory pages 150, 152, and 154, each of which further subdivides the address range index by the associated directory entry of the root d rectory 142. In FIG. 6, this subdivision process continues as each of the directory pages 150, 152, and 154 each again have directory entries that locate subordinate directory pages including the depicted examples of directory pages 160, 162, 164, and 166.

The depicted example of directory pages 160, 162, 164, and 166 are each leaf entries. The leaf entries contain directory entries such as the directory entries 156 and 158 of the leaf entry 160, that store a range field 130 and the responsible node field 132. These leaf entries identify an address and a responsible node for the page in the distributed memory space that is being accessed, such as the depicted pages 170–184. For example, as depicted in FIG. 6, the leaf entry 156 points to the page 170 that corresponds to the range field 130 of the leaf entry 156, which for a leaf entry is the page being accessed. In this way, the directory structure 140 provides location information for pages stored in the distributed address space.

In the depicted embodiment of FIG. 6, a node selector can select a responsible node for each page, as described above, so that the leaf entry 156 provides information of the address and responsible node of the page being located. Accordingly, this directory tracks ownership and responsibility for data, to provide a level of indirection between the directory and the physical location of the data. During a memory access operation, the memory subsystem 70 passes to the responsible node indicated in the leaf entry 156 the address of the page being accessed. The shared memory subsystem of that node can identify a node that stores a copy of the page being accessed, including the owner node. This identification of a node having a copy can be performed by the RAM copyset or disk copyset of the responsible node. The node having a copy stored in its local physical memory, such as the owner node, can employ its local cache elements, including the local RAM cache and local disk cache to the identify from the global address signal a physical location of the data stored in the page being accessed. The cache element can employ the operating system of the owner node to access the memory device that maintains that physical location in order that the data stored in the page can be accessed. For a read-memory operation, or for other similar operations, the data read from the physical memory of the owner node can be passed via the network to the memory subsystem of the node requesting the read and subsequently stored into the virtual memory space of the requesting node for use by that node.

With reference again to FIG. 6, it can be seen that the depicted directory structure 140 comprises a hierarchical structure. To this end, the directory structure 140 provides a structure that continually subdivides the memory space into smaller and smaller sections. Further, each section is represented by directory pages of the same structure, but indexes address spaces of different sizes. As pages are created or deleted, a linker inserts or deletes the pages from the directory. In one embodiment, the linker is a software module for linking data structures. The linker can operate responsive to the address ranges to provide the depicted hierarchical structure. Accordingly, the depicted directory 140 provides a scaleable directory for the shared address space. Moreover, the directory pages are stored in the distributed address space and maintained by the distributed shared memory system. A root for the directory can be stored in known locations to allow for bootstrap of the system.

Consequently, commonly used pages are copied and distributed, and rarely used pages are shuffled off to disk. Similarly, directory pages will migrate to those nodes that access them most, providing a degree of self-organization that reduces network traffic.

Figure 7:
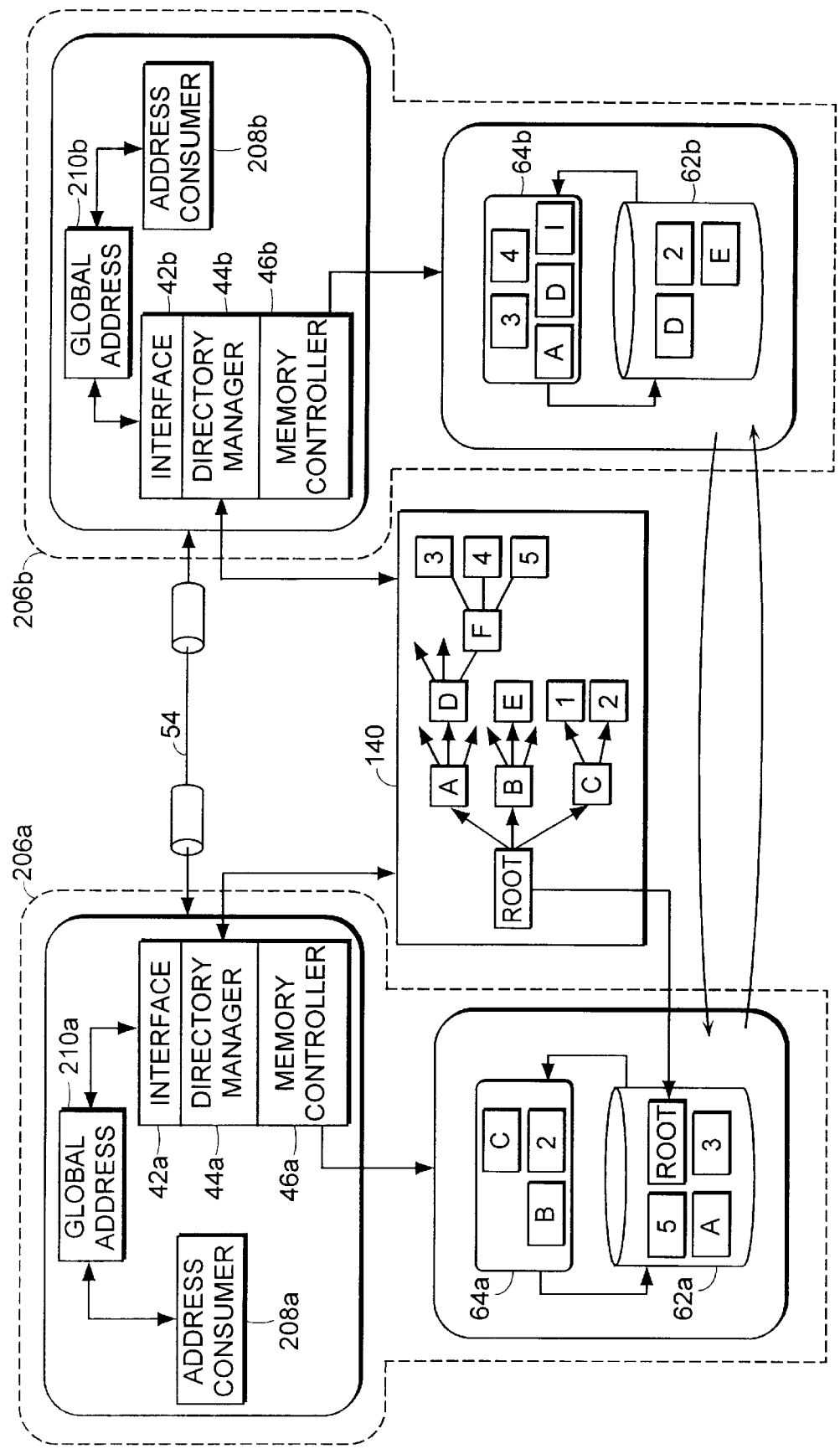
FIG. 7 illustrates in functional block diagram form a system of the invention that employs a directory according to FIG. 6 for tracking portions of a distributed shared memory.

FIG. 7 depicts the directory of FIG. 6 being employed by a system according to the invention. In particular FIG. 7 depicts a system 200 that includes two nodes, 206a and 206b, a directory structure 140, and a pair of local memories having volatile memory devices 64a and 64b, and persistent memory devices 62a and 62b. Depicted node 206a includes an address consumer 208a, a global address 210a, and interface 42a, a directory manager 44a and a memory controller 46a. Node 206b has corresponding elements. The nodes are connected by the network 54. A directory 140 having a root page, directory pages A–F and pages 1–5 is further depicted.

Each node 206a and 206b operates as discussed above. The depicted address consumers 208a and 208b can be an application program, file system, hardware device or any other such element that requests access to the virtual memory. In operation, the address consumers 208a and 208b request an address, or range of addresses, and the directory manager can include a global address generator that provides the consumer with the requested address, or a pointer to the requested address. As addresses get generated, the respective directory managers 44a and 44b generate directory pages and store the pages in the directory structure 140. As depicted, the directory structure 140 tracks the portions of the address space being employed by the system 200, and physical storage for each page is provided within the local memories.

As shown in FIG. 7, the data associated with the directory pages are distributively stored across the two local memories and duplicate copies can exist. As described above and now illustrated in FIG. 7, the data can move between different local memories and also move, or page, between volatile and persistent storage. The data movement can be responsive to data requests made by memory users like application programs, or by operation of the migration controller described above. As also described above, the movement of data between different memory locations can occur without requiring changes to the directory 140. This is achieved by providing a directory 140 that is decoupled from the physical location of the data by employing a pointer to a responsible node that tracks the data storage location. Accordingly, although the data storage location can change, the responsible node can remain constant, thereby avoiding any need to change the directory 140.

It will be understood to those of ordinary skill in the art that certain modification, additions, and subtractions can be made to the embodiments described above without departing from the spirit and scope of the invention. Accordingly, the invention described above is not to be limited to the illustrated embodiments and is to be understood by the claims set forth below.

What is claimed is:

1. A computer system having a shared addressable memory space, comprising
    a data network for carrying data signals representative of computer readable information, and
    a plurality of computers, each of said plurality of computers sharing the shared addressable memory space and including
        an interface, coupled to said data network, for accessing said data network to exchange data signals therewith,
        a local volatile memory device coupled to said computer and having volatile storage for data signals,
        a local persistent memory device coupled to said computer and having persistent storage for data signals, and
        a shared memory subsystem for mapping a portion of said shared addressable memory space to a portion or the whole of said persistent storage and said volatile storage to provide thereby addressable persistent and volatile storage for data signals accessible by each of the plural computers, said shared memory subsystem including
            a distributor for mapping portions of said addressable memory space across said plurality of local persistent memory devices, to distribute said addressable memory space across said plurality of local persistent memory devices, and
            a disk directory manager for tracking said mapped portions of said addressable memory space to provide information representative of which of said local persistent memory devices has which of said portions of said addressable memory space mapped thereon.

2. A computer system according to claim 1 further comprising
    a cache system for operating one of said local persistent memory devices as a cache memory for cache storing data signals associated with recently accessed portions of said addressable memory space.

3. A computer system according to claim 1 further comprising
    a migration controller for selectively moving portions of said addressable memory space between said local persistent memory devices of said plurality of computers.

4. A computer system according to claim 1 further comprising
    a replication controller for generating a copy of a portion of said addressable memory space maintained in said local persistent memory device of a first one of said computers and for storing said copy in said local persistent memory device of a second one of said computers.

5. A computer system according to claim 1 further comprising
    a RAM directory manager for tracking said mapped portions of said addressable memory space to provide information representative of which of said local volatile memory devices has which of said portions of said addressable memory space mapped thereon.

6. A computer system according to claim 1 further comprising
    a RAM cache system for operating one of said local volatile memory devices as a cache memory for cache storing data signals associated with recently accessed portions of said addressable memory space.

7. A computer system according to claim 1 further comprising
    a paging element for remapping a portion of said addressable memory space between one of said local volatile memory devices and one of said local persistent memory devices.

8. A computer system according to claim 7 further comprising
    a policy controller for determining a resource available signal representative of storage available on each of said plural computers and, and wherein said paging element remaps said portion of addressable memory space from a memory device of a first computer to a memory device of a second computer, responsive to said resource available signal.

9. A computer system according to claim 1 further comprising a migration controller for moving portions of addressable memory space between said local volatile memory devices of said plurality of computers.

10. A computer system according to claim 1 further comprising a hierarchy manager for organizing said plurality of computers into a set of hierarchical groups wherein each group includes at least one of said plurality computers.

11. A computer system according to claim 10 wherein each said group includes a group memory manager for migrating portions of addressable memory space as a function of said hierarchical groups.

12. A computer system according to claim 1 further comprising a coherent replication controller for generating a coherent copy of a portion of addressable memory space.

13. A computer system according to claim 1 further comprising an address generator for generating a global address signal representative of a portion of addressable memory space.

14. A computer system according to claim 13, wherein said address generator includes a spanning unit for generating global address signals as a function of a storage capacity associated with said persistent memory devices, to provide global address signals capable of logically addressing said storage capacity of said persistent memory devices.

15. A computer system according to claim 1 further comprising a distributed directory manager for storing within said distributed memory space, a directory signal representative of a storage location of a portion of said addressable memory space.

16. A computer system according to claim 15 wherein said distributed directory manager includes a directory page generator for allocating a portion of said addressable memory space and for storing therein an entry signal representative of a portion of said directory signal.

17. A computer system according to claim 16 wherein said directory page generator includes a range generator for generating a range signal representative of a portion of said addressable memory, space, and for generating said entry signal responsive to said range signal, to provide an entry signal representative of a portion of said directory signal that corresponds to said portion of said addressable memory space.

18. A computer system according to claim 17 wherein said distributed directory manager includes; a linking system for linking said directory pages to form a hierarchical data structure of said linked directory pages.

19. A computer system according to claim 17 wherein said distributed directory manager includes a range linking system for linking said directory pages, as a function of said range signal, to form a hierarchical data structure of linked directory pages.

20. A computer system according to claim 16 wherein said directory page generator includes a node selector for generating a responsible node signal representative of a select one of said plural computers having location information for a portion of said shared address space.

21. A computer system according to claim 1 further comprising, a page generator for generating a directory page that carries information representative of a location monitor that tracks a data storage location, to provide a directory structure for tracking homeless data.

22. A computer system according to claim 21 wherein said data storage location stores information representative of a directory page, to store said directory structure as pages of homeless data.

23. A computer system according to claim 1 further comprising a distributed directory manager for storing a directory signal representative of a portion of said addressable memory space.

* * * * *